UNITED STATES PATENT OFFICE.

HORACE W. LASH, OF CLEVELAND, OHIO.

MANUFACTURE OF STEEL.

No. 805,564. Specification of Letters Patent. Patented Nov. 28, 1905.

Application filed December 1, 1903. Serial No. 183,363.

*To all whom it may concern:*

Be it known that I, HORACE W. LASH, a citizen of the United States, residing at Cleveland, in the county of Cuyahoga, State of Ohio, (having a post-office address at the New England Building, in said city of Cleveland,) have invented certain new and useful Improvements in the Manufacture of Steel, of which the following is a full and true description especially describing one mode of carrying out the new process devised by me.

My invention especially relates to the manufacture of steel from molten pig-iron, and more especially pig-iron manufactured from the non-bessemer ores such as are found in Alabama, in northern New York, and in Nova Scotia, and it relates to a novel and exceedingly economical method of treating the pig-iron.

In its preferred embodiment my present invention is an improvement on that especially described and claimed in my application, Serial No. 128,634, filed October 24, 1902.

My present process consists in providing an open-hearth furnace with a molten body (of which the kinds hereinbefore mentioned are examples) containing metalloids and then adding to such molten mass bessemerized or other refined metal, preferably containing iron oxids, and after subsidence of the violent chemical action, due to the action of the iron oxids upon the metalloids, drawing off the resulting refined metal.

In carrying out my new process I prefer that the quantity of refined oxidized metal shall greatly exceed that of the pig-iron, which contains the metalloids, to which it is added, and that the temperature of the bessemerized metal containing oxids shall be considerably above that of the unrefined bath. I also prefer, more especially for economic reasons connected with the bessemerizing, that the refined metal shall be added in successive quantities.

Referring to the treatment of pig-iron, especially when produced from the non-bessemer ores hereinbefore referred to, I prefer that the refined metal containing oxids added to the bath in the open-hearth furnace shall be bessemerized metal purposely charged with oxygen and shall be conveyed directly from the Bessemer converter into the molten pig-iron containing metalloids and in successive "blows."

I have found that the chemical action set up in the unrefined bath containing metalloids is so great when molten charges of bessemerized metal or other refined metal purposely charged with oxygen are added thereto that the whole mass is reduced to a substantially pure condition ready to be drawn for direct casting into ingots.

At any time during the filling of the open-hearth furnace, either before or during the addition of the refined charge or charges, basic additions can be made to the bath, and the work of dephosphorization will be carried on during the filling of the furnace with the more refined metal, which has been purposely charged with oxygen.

An exceedingly economical embodiment of my invention is practiced as follows: Take directly from the blast-furnace or from the mixer molten pig-iron—say twenty-five per cent. of the total amount of the ultimate refined product—and turn this into a basic-lined open-hearth furnace, preferably of a size to hold from fifty to sixty tons of metal. This unrefined metal contains carbon and silicon and will, in addition to the economies realized by omission of the bessemerizing step, furnish sufficient carbon to prevent the product under treatment too nearly approaching metallic iron, as well as rendering unnecessary the addition of carbon-bearing material to the basic-lined open-hearth furnace. The molten pig-iron of an amount necessary to complete the charge for the basic-lined open-hearth furnace is withdrawn from the blast-furnace or mixer and treated as rapidly as possible and for economic reasons treated in successive quantities in the Bessemer converter wherein the manganese, silicon, and carbon are removed and the metal is highly charged with oxygen in contradistinction to the ordinary treatment in the Bessemer converter, which results in a finished product containing as little oxygen as possible. As rapidly as converted the bessemerized metal purposely charged with oxygen is turned into the bath of unrefined metal containing metalloids in the basic-lined open-hearth furnace, whereupon a violent chemical action is set up, due to the presence of oxid of iron in the bessemerized or refined metal and the metalloids in the unrefined metal, the oxid attacking and oxidizing the metalloids contained in the unrefined bath, while the metalloids act as a reducing agent and reclaim the greater portion of the iron held in the form of oxid in the bessemerized or refined metal, and in this way the purification of the whole bath is rapidly accomplished with the formation of but little slag.

The transfer directly to the basic-lined open-hearth furnace results, of course, in a reduction in expenses for bessemerizing such amount. At present the cost of bessemerizing one ton of pig-metal for use in the open-hearth furnace is about two dollars. By my process, whereby approximately one-fourth of the total amount of pig-metal may be directly treated in the basic-lined open-hearth furnace, a saving can be effected of from twenty to thirty dollars for each tap of fifty tons delivered from the open-hearth furnace.

As I have stated hereinbefore little slag is formed in the basic-lined open-hearth furnace under my process. Any such slag can, however, be run off with the tap from the furnace, and it is not necessary, as in other methods now in use, to remove the slag from time to time.

It is of course not essential to my process that the unrefined and refined metals shall be drawn from the same mixer or blast-furnace. Broadly stated, my process includes conveying molten pig-iron containing metalloids into a basic-lined open-hearth furnace and adding thereto a greater quantity of bessemerized or other refined metal containing iron oxids. The advantage of the use of the unrefined pig-metal, aside from saving of expenses in manufacture, is found in the fact that thereby sufficient carbon is given to the mixture in the basic-lined open-hearth furnace to allow the dephosphorizing of the mass undergoing refinement to be carried on without decreasing the amount of carbon too much.

Under the conditions practiced by me a fifty-ton open-hearth furnace can be made to produce approximately eight casts of steel per day of twenty-four hours, whereas by the old method—commonly known as the "pig-and-ore" process—the operator produces approximately two casts in twenty-four hours. Employing my process it will usually require one hour after the addition of the bessemerized metal is made to convert the bath in the open-hearth furnace into refined metal. When one furnace has been filled as described, another can be ready to refill. In this way a cast of from fifty to sixty tons of basic open-hearth steel can be taken from each furnace at least every three hours.

What I claim is—

1. The process of manufacturing steel from pig-iron which comprises supplying a portion of unrefined iron to an acid-lined receptacle, eliminating the silicon therefrom and charging the same with iron oxid, supplying a second portion of unrefined iron to a basic-lined open-hearth furnace, pouring therein the partially-refined metal charged with iron oxid and making basic additions to the bath.

2. The process of manufacturing steel from pig-iron which comprises supplying a portion of unrefined iron to an acid-lined converter, blowing the same until the silicon is oxidized and the metal is charged with iron oxid, supplying a second portion of unrefined iron to a basic-lined open-hearth furnace, adding thereto the metal from the converter, and making basic additions to the bath.

3. The process of manufacturing steel from pig-iron which comprises supplying a portion of unrefined iron to an acid-lined receptacle and oxidizing the same until charged with iron oxid, supplying a second portion to a basic-lined open-hearth furnace and adding thereto the metal charged with iron oxid, the proportions of the respective portions being such that the oxygen carried into the hearth by the first-mentioned portion will be sufficient to practically oxidize the metalloids contained in the second-mentioned portion.

HORACE W. LASH.

Witnesses:
Wm. H. Berrigan,
James J. Cosgrove.